United States Patent Office 2,868,634
Patented Jan. 13, 1959

2,868,634

TERPENE PHENOXYACETATE GROWTH REGULATORS

Charles F. Krewson, Abington, and Edward J. Saggese, Upper Darby, Pa., assignors to the United States of America as represented by the Secretary of Agriculture No Drawing. Application November 20, 1957
Serial No. 697,751

7 Claims. (Cl. 71—2.6)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to herbicides, or weed killers, especially mesquite killers, and to the selective control of plant growth. More particularly, this invention relates to the use of a group of compounds represented by the general formula $$A-O-C-CH-R$$
$$\quad \parallel \quad \mid$$
$$\quad O \quad R'$$

wherein A is a terpene radical such as nopyl, hydronopyl, and α-terpinyloxyethyl, R' is H or CH$_3$, and R is a nuclearly chlorinated phenoxy or nuclearly chlorinated phenoxy alkyl radical, as for example, the radicals 4-chlorophenoxy, 2,4-dichlorophenoxy, 2,4,5-trichlorophenoxy, 2-methyl-4-chlorophenoxy, and 2,4-dichlorophenoxyethyl.

An object of this invention is to provide stable herbicidal compounds that may be formulated and applied by conventional procedures. Another object of the present invention is to provide compounds which when properly formulated and applied have herbicidal activity against mesquite. A further object is to provide compounds which will retard growth or kill mesquite without adversely affecting the growth of a desired plant species. Still another object of the present invention is to provide herbicides of exceptionally low volatility, thereby preventing winddrift and the resulting damage to plants for which the herbicide was not intended.

We have discovered that a group of terpene derivatives of nuclearly chlorinated phenoxy acids are compounds which meet the objective of very low volatility and which have desirable herbicidal properties. For example, certain compounds in this group are especially effective herbicides for mesquite. Other compounds are selective herbicides for killing weeds (including undesired crops) in lespedeza or oats. While especially valuable as post-emergent herbicides, for either complete or selective herbicidal activity, these terpene derivatives also appear particularly useful as pre-emergence treatments for certain crops.

The terpene compounds converted to the herbicides of the present invention are readily available as products of the Naval Stores industry and are known in the trade as hydronopol (I), nopol (II) and terpinyl ethylene glycol ether (III). These compounds are described by the following structures:

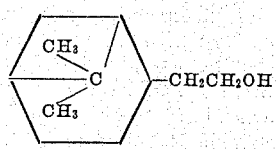

Hydronopol (I)
1-[6,6-dimethylbicyclo-(1,1,3)-hept-2-yl]-ethan-2-ol

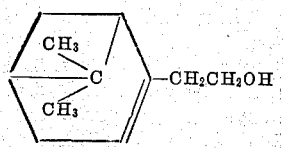

Nopol (II)
1-[6,6-dimethylbicyclo-(1,1,3)-hept-2-en-2-yl]-ethan-2-ol

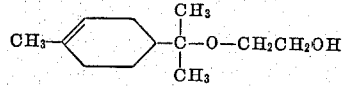

α-Terpinyl ethylene glycol ether (III)

In the practice of this invention the terpene compounds, hydronopol, nopol, and terpinyl ethylene glycol ether were acylated with nuclearly chlorinated phenoxy alkyl acids such as 4-chlorophenoxyacetic acid, 2-methyl-4-chlorophenoxyacetic acid, 2,4-dichlorophenoxyacetic acid, 2,4,5-trichlorophenoxyacetic acid, 2-(2,4-dichlorophenoxy)propionic acid, 4-(2,4-dichlorophenoxy)butyric acid, and DL-2-(2,4,5-trichlorophenoxy)propionic acid to produce the corresponding terpene derivatives.

The descriptions which follow are given to illustrate the procedures employed in the preparation of the terpene esters. In general, the hydronopol derivatives were made by using azeotropic dehydration techniques and the nopol derivatives by using Schotten-Baumann procedures. Subsequently, after completing this series of nopol esters it was found that nopyl-2,4,5-trichlorophenoxyacetate could be prepared azeotropically in xylene or benzene with or without the use of catalysts. However, the azeotropic technique as a method of preparing nopol esters had at first been abandoned because these compounds were expected to be crystalline following the pattern of the first two terpene esters prepared, hydronopyl-4-chloro- and hydronopoyl-2,4,5-trichlorophenoxyacetate.

With the exception of 2-methyl-4-chlorophenoxyacetic acid which was purified by recrystallization from benzene, the halogenated phenoxy acids and the terpene compounds were technical grades and were used without purification.

EXAMPLE 1

*Hydronopyl-2,4,5-trichlorophenoxyacetate.*—To hydronopol (I) (1009 grams, 6.0 moles) dissolved in 1000 ml. toluene was added 1532 grams (6.0 moles) of 2,4,5-trichlorophenoxyacetic acid and 5 ml. of concentrated sulfuric acid. This mixture was refluxed 7 hours, the theoretical amount of water being collected within this time in an attached moisture tube. When cool the reaction mixture was washed successively with dilute sodium carbonate solution and distilled water. The solvent was stripped off and the product, 2093 grams (86% yield) was purified by two recrystallizations from petroleum ether to give 1825 grams (75% yield) of hydronopyl-2,4,5-trichlorophenoxyacetate, M. P. 55–56° C. The latter yield is lower than need be because no attempt was made to recover additional product from mother liquors. Data pertaining to hydronopyl-2,4,5-trichlorophenoxyacetate are presented in Table I.

EXAMPLE 2

*Hydronopyl-4-chlorophenoxyacetate.* — Employing appropriate starting materials, hydronopyl-4-chlorophenoxyacetate was synthesized and purified by substantially the same procedures as described in Example 1.

EXAMPLE 3

*Hydronopyl-2-(2,4-dichlorophenoxy)propionate.* — To 42.1 grams (0.25 mole) of hydronopyl dissolved in 200 ml. xylene was added 56.8 grams (0.25 mole) of DL-2-(2,4-dichlorophenoxy)propionic acid and 0.5 ml. sulfuric acid. This mixture was refluxed for 10 hours, sufficient time for the collection of the theoretical amount of water in an attached moisture tube. Acid was removed by washing, as described in Example 1. The solvent was stripped off and the resulting product, 85 grams (88.3% yield) was distilled under vacuum. A center cut of 69.3 grams of hydronopyl-2-(2,4-dichlorophenoxy)propionate, boiling at 206–208° C. at 2 mm. Hg pressure, was collected for incorporation into growth regulator formulations. This compound is entered in Table I as Example 3.

EXAMPLES 4 to 6

*Hydronopyl - 4 - (2,4 - dichlorophenoxy)butyrate, hydronopyl-2,4-dichlorophenoxyacetate, and hydronopyl-2-methyl-4-chlorophenoxyacetate.*—These were prepared by the procedures described in Example 3 and data concerning these compounds are presented in Table I.

EXAMPLE 7

*Nopyl-4-chlorophenoxyacetate.*—Nopol, 16.1 grams (0.1 mole) was suspended in 300 ml. of 1 N sodium hydroxide solution. After chilling to 5° C. in an ice bath a benzene solution (60 ml.) containing 20.5 grams (0.1 mole) of 4-chlorophenoxyacetyl chloride was added dropwise over a 1-hour period, temperature being maintained at 5° C. Following this, mechanical stirring was continued for about 4 hours and the reaction mixture allowed to warm up to room temperature. The mixture was extracted three times with 100 ml. portions of benzene, the benzene extracts combined, and washed successively with dilute hydrochloric acid, sodium carbonate solution, and water. Removal of the benzene from the washed solution gave an oil with a strong odor of nopol. The unreacted nopol was removed from the product by means of steam distillation. Extraction with ether (3 times with 100 ml. ether) followed by drying under vacuum at 65° C. gave 27.6 grams (82.5% yield) of nopyl-4-chlorophenoxyacetate. This product was vacuum distilled and the fraction boiling at 147–149° C. at 0.05 mm. Hg pressure was used for formulations.

EXAMPLES 8 TO 12

Compounds listed in Table I as Examples 8 to 12 were prepared and purified by the procedures described in Example 7.

EXAMPLE 13

*2 - (α - terpinyloxyethyl) - 4 - chlorophenoxyacetate.*—To terpinyl ethylene glycol ether, 19.8 grams (0.1 mole) in sodium hydroxide solution (100 ml., 1 N) at 5° C. was added 5 ml. of pyridine. A chloroform solution (50 ml.) containing 20.5 grams (0.1 mole) of 4-chlorophenoxyacetyl chloride was added dropwise with stirring over a 2-hour period. The reaction mixture was stirred an additional 2 hours during which time it was allowed to warm up to room temperature, and was then extracted 3 times with chloroform. The combined chloroform extracts were successively washed with dilute hydrochloric acid, sodium bicarbonate solution, and distilled water. The product was recovered by evaporating off the chloroform and removing the unreacted terpene by steam distillation. The crude product was taken up in chloroform and dried thoroughly to remove all water and chloroform. The resulting liquid was dissolved in anhydrous benzene and passed through a column containing activated alumina. The benzene eluate was concentrated and vacuum dried at 70° C. to give 8.4 grams (23.1% yield) of 2-(α-terpinyloxyethyl)-4-chlorophenoxyacetate boiling at 155–160° C. at 0.7 mm. Hg pressure.

The low-volatile compounds described in Examples 1–13 have pleasant odors and are, with two exceptions, liquids. These compounds may be readily formulated and applied by conventional procedures. Some examples of the application of these compounds follow.

EXAMPLE 14

The compounds of Examples 1, 9 and 12 were evaluated as herbicides using 2,4,5-trichlorophenoxyacetic acid, the propylene glycol butyl ether ester of 2,4,5-trichlorophenoxyacetic acid (2,4,5-T, PGBE) and 2-(2,4,5-trichlorophenoxy)propionic acid as controls. Aqueous 25% ethanol solutions containing 100 p. p. m. of 2,4,5-trichlorophenoxyacetic acid or this acid equivalent of the other

*Table I.—Physical and analytical data on terpene derivatives of aryloxyalkylcarboxylic acids*

| Example No. | Name | M. P., ° C. (Corr.) or, B. P., ° C. (Uncorr.) | $n_D^{24}$ | Yield, Percent | Chlorine Analysis, Percent | |
|---|---|---|---|---|---|---|
| | | | | | Calc'd. | Found |
| 1 | Hydronopyl - 2,4,5 - trichlorophenoxyacetate. | 55–56 | a 1.5319 | 86.0 | 26.22 | 25.66 |
| 2 | Hydronopyl - 4 - chlorophenoxyacetate. | 45.5–46.0 | a 1.5137 | 54.2 | 10.53 | 10.87 |
| 3 | Hydronopyl - 2 - (2,4-dichlorophenoxy)propionate. | 206–208 at 2 mm | 1.5265 | 88.3 | 18.40 | 18.39 |
| 4 | Hydronopyl - 4 - (2,4-dichlorophenoxy)butyrate. | 198–200 at 0.3 mm | 1.5299 | 97.2 | 17.76 | 17.85 |
| 5 | Hydronopyl - 2,4 - dichlorophenoxyacetate. | 206–208 at 1.2 mm | 1.5358 | 86.3 | 19.10 | 19.09 |
| 6 | Hydronopyl - 2 - methyl - 4 - chlorophenoxyacetate. | 188–190 at 0.5 mm | 1.5239 | 75.4 | 10.10 | 10.03 |
| 7 | Nopyl - 4 - chlorophenoxyacetate. | 147–149 at 0.05 mm | 1.5322 | 82.6 | 10.58 | 10.54 |
| 8 | Nopyl - 2,4 - dichlorophenoxyacetate. | 180–182 at 0.06 mm | 1.5399 | 57.3 | 19.10 | 19.37 |
| 9 | Nopyl - 2,4,5 - trichlorophenoxyacetate. | 187–189 at 0.5 mm | 1.5490 | 53.0 | 26.34 | 26.43 |
| 10 | Nopyl - 2 - methyl - 4 - chlorophenoxyacetate. | 163–165 at 0.1 mm | 1.5292 | 25.0 | 10.10 | 10.73 |
| 11 | Nopyl - 2 - (2,4-dichlorophenoxy)propionate. | 128–130 at 2.7 mm | 1.5310 | 76.1 | 18.49 | 18.80 |
| 12 | Nopyl-2-(2,4,5-trichlorophenoxy)propionate. | 183–185 at 0.5 mm | 1.5420 | 26.3 | 26.46 | 26.40 |
| 13 | 2 - (α - Terpinyloxyethyl) - 4 - chlorophenoxyacetate. | 158–160 at 0.6 mm | 1.5212 | 42.1 | 9.66 | 9.88 | a At 60° C.

compounds, were prepared. Eight month old mesquite seedlings were dipped into one of the solutions, 25 replicates per solution, and the excess solution was allowed to drain off. Herbicidal effects, as determined at the end of 40 days, are recorder in Table II.

Table II.—Response after 40 days to treatment described in Example 14 of 8 month old mesquite seedlings

| Name | Plants Killed, Percent | Stem Tissue Killed, Percent |
|---|---|---|
| 2,4,5-Trichlorophenoxyacetic acid | 21 | 83 |
| 2,4,5-T, PGBE | 33 | 94 |
| Hydronopyl-2,4,5-trichlorophenoxyacetate | 46 | 94 |
| Nopyl-2,4,5-trichlorophenoxyacetate | 50 | 92 |
| 2-(2,4,5-Trichlorophenoxy)propionic acid | 19 | 82 |
| Nopyl-2-(2,4,5-trichlorophenoxy)propionate | 10 | 89 |

EXAMPLE 15

Aqueous 25% ethanol solutions of the compounds of Examples 1, 2, 3, 5, 6, 7, 8, 9, 10, 11 and 13 were prepared. These solutions contained a weight of terpene ester equivalent to 100 p. p. m. of the parent acid. Solutions of 100 p. p. m. based on the acid were also prepared for 2,4,5-trichlorophenoxyacetic acid, its propylene glycol butyl ester, 2,4-dichlorophenoxyacetic acid and 4-chlorophenoxyacetic acid. The solutions were evaluated by determining the percent leaf drop in seven days of 8 month old mesquite seedlings. Twenty-five plants per solution were used, dipping the leaf portions of the plant into the solution and allowing excess solution to drain off. Results are presented in Table III.

Table III.—Effect of aqueous 25% solutions of various compounds upon leaf drop of 8 month old mesquite

| Name | Leaf Kill, Percent |
|---|---|
| Hydronopyl-2,4,5-trichlorophenoxyacetate | 91 |
| Nopyl-2,4,5 trichlorophenoxyacetate | 88 |
| Propylene glycol butyl ester of 2,4,5-trichlorophenoxyacetic acid | 81 |
| 2,4,5-Trichlorophenoxyacetic acid | 52 |
| Hydronopyl-2-methyl-4-chlorophenoxyacetate | 37 |
| Nopyl-2-methyl-4-chlorophenoxyacetate | 52 |
| Hydronopyl-2-(2,4-dichlorophenoxy)propionate | 44 |
| Nopyl-2-(2,4-dichlorophenoxy)propionate | 45 |
| 2,4-Dichlorophenoxyacetic acid | 14 |
| Hydronopyl-2,4-dichlorophenoxyacetate | 19 |
| Nopyl-2,4-dichlorophenoxyacetate | 16 |
| 4-Chlorophenoxyacetic acid | 13 |
| Hydronopyl-4-chlorophenoxyacetate | 11 |
| Nopyl-4-chlorophenoxyacetate | 11 |
| 2-(α-Terpinyloxyethyl)-4-chlorophenoxyacetate | 11 |

The results of Examples 14 and 15 show that the nopyl and hydronopyl esters of 2,4,5-trichlorophenoxyacetic acid are exceptionally effective herbicides for mesquite. Although the cited terpene derivatives of the other chlorinated phenoxy acids, as in Table III, were less effective than the nopyl and hydronoply esters of 2,4,5-trichlorophenoxyacetic acid they were generally as effective or more effective, than the parent chlorinated phenoxy acids of which they were derivatives.

EXAMPLE 16

Post-emergence tests were conducted on several plant species. Healthy, young plants were sprayed with an amount of an aqueous acetone solution of herbicide sufficient to deposit on the growing area a weight of herbicide corresponding to 1 pound per acre. After a growing period of 2 weeks the unsprayed controls and any plants remaining in the sprayed trays were collected and the respective weights of the freshly harvested plants were recorded. Results are presented in Table IV.

The selectivity of certain of the terpene esters is illustrated by the values in Table IV, especially for killing weeds in lespedeza and oats.

Table IV.—Effect of terpene derivatives on plants when applied as foliage sprays at rate of one pound acid equivalent per acre

| Example No. | Name | Percentage Reduction in Green Weight Yield | | | | | | | | | | | |
|---|---|---|---|---|---|---|---|---|---|---|---|---|---|
| | | White Clover | Red Clover | Alfalfa | Sweet Clover | Lespedeza | Soybeans | Cucumber | Rape | Mustard | Pigweed | Lamb's-quarters | Oats |
| 1 | Hydronopyl-2,4,5-trichlorophenoxyacetate | 100 | 100 | 98 | 98 | 100 | 100 | 100 | 100 | 94 | 100 | 100 | 15 |
| 2 | Hydronopyl-4-chlorophenoxyacetate | 95 | 94 | 83 | 74 | 100 | 100 | 100 | 100 | 100 | 96 | 100 | 23 |
| 3 | Hydronopyl-2-(2,4-dichlorophenoxy)propionate | 100 | 96 | 95 | 97 | 0 | 81 | 100 | 100 | 100 | 83 | 92 | 9 |
| 4 | Hydronopyl-4-(2,4-dichlorophenoxy)butyrate | 18 | 16 | 41 | 90 | 0 | 59 | 54 | 97 | 69 | 100 | 91 | 5 |
| 5 | Hydronopyl-2,4-dichlorophenoxyacetate | 100 | 100 | 100 | 100 | 100 | 100 | 87 | 100 | 100 | 100 | 100 | 15 |
| 6 | Hydronopyl-2-methyl-4-chlorophenoxyacetate | 100 | 55 | 100 | 100 | 86 | 100 | 100 | 100 | 100 | 100 | 100 | 0 |
| 8 | Nopyl-2,4-dichlorophenoxyacetate | 100 | 100 | 100 | 100 | 100 | 100 | 93 | 100 | 100 | 100 | 100 | 19 |
| 9 | Nopyl-2,4,5-trichlorophenoxyacetate | 100 | 100 | 98 | 95 | 100 | 100 | 100 | 98 | 100 | 100 | 100 | 15 |
| 10 | Nopyl-2-methyl-4-chlorophenoxyacetate | 99 | 87 | 98 | 78 | 100 | 100 | 100 | 100 | 100 | 100 | 100 | 0 |
| 11 | Nopyl-2-(2,4-dichlorophenoxy)propionate | 94 | 99 | 95 | 100 | 0 | 85 | 100 | 99 | 98 | 100 | 86 | 12 |
| 12 | Nopyl-2-(2,4,5-trichlorophenoxy)propionate | 100 | 100 | 95 | 98 | 100 | 100 | 100 | 98 | 100 | 100 | 100 | 16 |
| 14 | 2,4,5-Trichlorophenoxyacetic acid | 100 | 100 | 93 | 98 | 100 | 100 | 100 | 98 | 100 | 95 | 100 | 7 |
| 15 | DL-2-(2,4-dichlorophenoxy)propionic acid | 99 | 90 | 91 | 97 | 100 | 99 | 100 | 100 | 97 | 99 | 85 | 0 |
| 16 | 4-(2,4-Dichlorophenoxy)butyric acid | 10 | 16 | 30 | 86 | 36 | 69 | 41 | 100 | 78 | 100 | 92 | 14 |
| 17 | 2,4-Dichlorophenoxyacetic acid | 99 | 100 | 100 | 100 | 100 | 100 | 87 | 100 | 100 | 100 | 100 | 15 |
| 18 | 2-Methyl-4-chlorophenoxyacetic acid | 100 | 65 | 100 | 100 | 100 | 100 | 95 | 100 | 100 | 100 | 100 | 3 |
| 19 | Check | 0 | 0 | 0 | 0 | 0 | 0 | 0 | 0 | 0 | 0 | 0 | 0 |

We claim:
1. The process of killing mesquite comprising contacting the mesquite plant with a phytotoxic concentration of a compound represented by the general formula

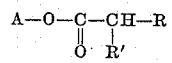

wherein A is a terpene radical selected from the group consisting of nopyl, hydronopyl and α-terpinyloxyethyl, R' is selected from the group consisting of H and CH₃, and R is selected from the group consisting of 4-chlorophenoxy, 2,4,-dichlorophenoxy, 2,4,5-trichlorophenoxy, 2-methyl-4-chlorophenoxy, and 2,4-dichlorophenoxyethyl.

2. The process of claim 1 in which the compound is nopyl-2,4,5-trichlorophenoxyacetate.

3. The process of claim 1 in which the compound is hydronopyl-2,4,5-trichlorophenoxyacetate.

4. The process of claim 1 in which the compound is nopyl-2-(2,4-dichlorophenoxy)propionate.

5. The process of claim 1 in which the compound is hydronopyl-2-(2,4-dichlorophenoxy)propionate.

6. The process of claim 1 in which the compound is nopyl-2-methyl-4-chlorophenoxyacetate.

7. The process of claim 1 in which the compound is hydronopyl-2-methyl-4-chlorophenoxyacetate.

References Cited in the file of this patent

UNITED STATES PATENTS

| 2,731,339 | Davie | Jan. 17, 1956 |
| 2,754,188 | Yowell et al. | July 10, 1956 |